(12) United States Patent
Dearth et al.

(10) Patent No.: US 10,275,386 B2
(45) Date of Patent: Apr. 30, 2019

(54) MEMORY PHYSICAL LAYER INTERFACE LOGIC FOR GENERATING DYNAMIC RANDOM ACCESS MEMORY (DRAM) COMMANDS WITH PROGRAMMABLE DELAYS

(71) Applicant: Advanced Micro Devices, Inc., Sunnyvale, CA (US)

(72) Inventors: Glenn A. Dearth, Groton, MA (US); Gerry Talbot, Concord, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 797 days.

(21) Appl. No.: 14/318,065

(22) Filed: Jun. 27, 2014

(65) Prior Publication Data

US 2015/0378956 A1 Dec. 31, 2015

(51) Int. Cl.
*G06F 13/16* (2006.01)
*G06F 13/28* (2006.01)
*G06F 13/42* (2006.01)

(52) U.S. Cl.
CPC ...... *G06F 13/4234* (2013.01); *G06F 13/1689* (2013.01); *G06F 13/28* (2013.01)

(58) Field of Classification Search
CPC .... G06F 13/4072; G06F 3/0674; G06F 3/061; G06F 3/0632; G06F 13/4234; G06F 13/28; G06F 13/1689
See application file for complete search history.

(56) References Cited

U.S. PATENT DOCUMENTS

| | | | | |
|---|---|---|---|---|
| 5,940,876 A | * | 8/1999 | Pickett | G06F 9/30043 711/204 |
| 7,647,467 B1 | | 1/2010 | Hutsell et al. | |
| 8,386,722 B1 | | 2/2013 | Wang et al. | |
| 2003/0236641 A1 | | 12/2003 | Liou | |
| 2005/0156646 A1 | * | 7/2005 | Liou | G11C 7/1006 327/276 |
| 2005/0228915 A1 | * | 10/2005 | Saripalli | G06F 13/4286 710/110 |
| 2007/0121399 A1 | * | 5/2007 | Bains | G11C 7/12 365/203 |

(Continued)

FOREIGN PATENT DOCUMENTS

| | | |
|---|---|---|
| EP | 2616946 | 6/2014 |
| JP | 2006260071 A | 9/2006 |
| KR | 1020120077315 | 1/2014 |

OTHER PUBLICATIONS

Non-Final Office Action dated Nov. 5, 2015 for U.S. Appl. No. 14/318,144, 19 pages.

(Continued)

*Primary Examiner* — Tim T Vo
*Assistant Examiner* — Phong H Dang

(57) ABSTRACT

A plurality of registers implemented in association with a memory physical layer interface (PHY) can be used to store one or more instruction words that indicate one or more commands and one or more delays. A training engine implemented in the memory PHY can generate at-speed programmable sequences of commands for delivery to an external memory and to delay the commands based on the one or more delays. The at-speed programmable sequences of commands can be generated based on the one or more instruction words.

19 Claims, 7 Drawing Sheets

(56) References Cited

U.S. PATENT DOCUMENTS

| | | | |
|---|---|---|---|
| 2008/0256282 A1* | 10/2008 | Guo | G06F 13/4239 710/305 |
| 2010/0100711 A1* | 4/2010 | Kaplan | G06F 9/223 712/208 |
| 2010/0257397 A1* | 10/2010 | Schoenborn | G06F 13/1689 713/401 |
| 2010/0275037 A1 | 10/2010 | Lee et al. | |
| 2012/0066445 A1 | 3/2012 | Searles | |
| 2012/0126868 A1 | 5/2012 | Machnicki et al. | |
| 2012/0250433 A1* | 10/2012 | Jeon | G11C 8/18 365/193 |
| 2012/0284576 A1 | 11/2012 | Housty et al. | |
| 2012/0307577 A1* | 12/2012 | Sriadibhatla | G11C 29/023 365/193 |
| 2013/0044796 A1* | 2/2013 | Haldar | G11C 29/023 375/224 |
| 2013/0124904 A1* | 5/2013 | Wang | G06F 1/12 713/401 |
| 2013/0151796 A1* | 6/2013 | Gupta | G06F 13/12 711/154 |
| 2013/0155788 A1 | 6/2013 | Brandl et al. | |
| 2013/0318285 A1 | 11/2013 | Pignatelli | |
| 2013/0340231 A1 | 12/2013 | Lu | |
| 2014/0006675 A1 | 1/2014 | Meir | |
| 2014/0043918 A1 | 2/2014 | Ellis et al. | |
| 2014/0063991 A1* | 3/2014 | Ji | G11C 7/222 365/194 |
| 2014/0079399 A1 | 3/2014 | Goswami | |
| 2014/0108683 A1 | 4/2014 | Thayer | |
| 2014/0114887 A1 | 4/2014 | Iyer et al. | |

OTHER PUBLICATIONS

International Search Report correlating to PCT/US2015/037172 dated Sep. 21, 2015, 9 pages.
Written Opinion correlating to PCT/US2015/037172 dated Sep. 21, 2015, 7 pages.
Final Office Action dated Apr. 27, 2016 for U.S. Appl. No. 14/318,144, 10 pages.
Advisory Action dated Jul. 15, 2016 for U.S. Appl. No. 14/318,114, 3 pages.
International Search Report and Written Opinion correlating to PCT/US2015/037158 dated Sep. 15, 2015, 9 pages.
International Preliminary Report on Patentability correlating to PCT/US15/037210 dated Dec. 27, 2016, 6 pages.
International Preliminary Report on Patentability correlating to PCT/US15/037172 dated Dec. 27, 2016, 8 pages.
U.S. Appl. No. 14/318,114, filed Jun. 27, 2014, entitled "Integrated Controller for Training Memory Physical Layer Interface".
Non-Final Office dated Aug. 25, 2016 for U.S. Appl. No. 14/318,114, 7 pages.
Extended European Search Report and Written Opinion dated Oct. 12, 2017 for EP Application No. 15 812 029.5, 7 pages.
Extended European Search Report dated Aug. 28, 2017 for EP Application No. 15 811 645.9, 7 pages.
Chinese office action and translation thereof dated Jan. 11, 2018 for Chinese Application No. 201580016122.2, 21 pages.
Translation of Second Office Action dated Aug. 3, 2018 for Chinese Application No. 201580016122.2, 10 pages.
Translation of the Office Action dated Oct. 15, 2018 for Japanese Application No. 2016-558772, 7 pages.

* cited by examiner

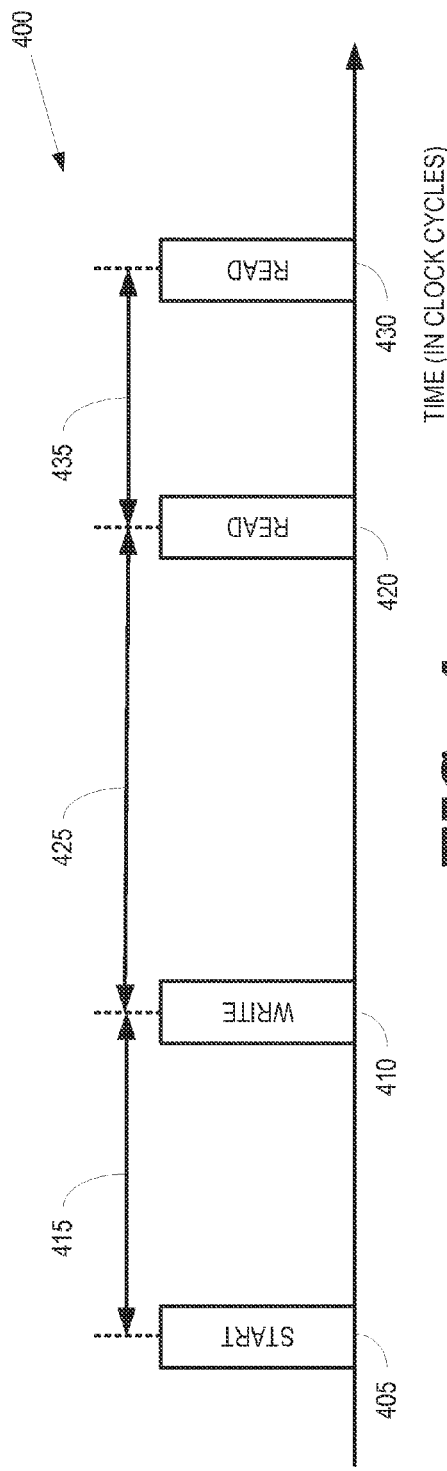
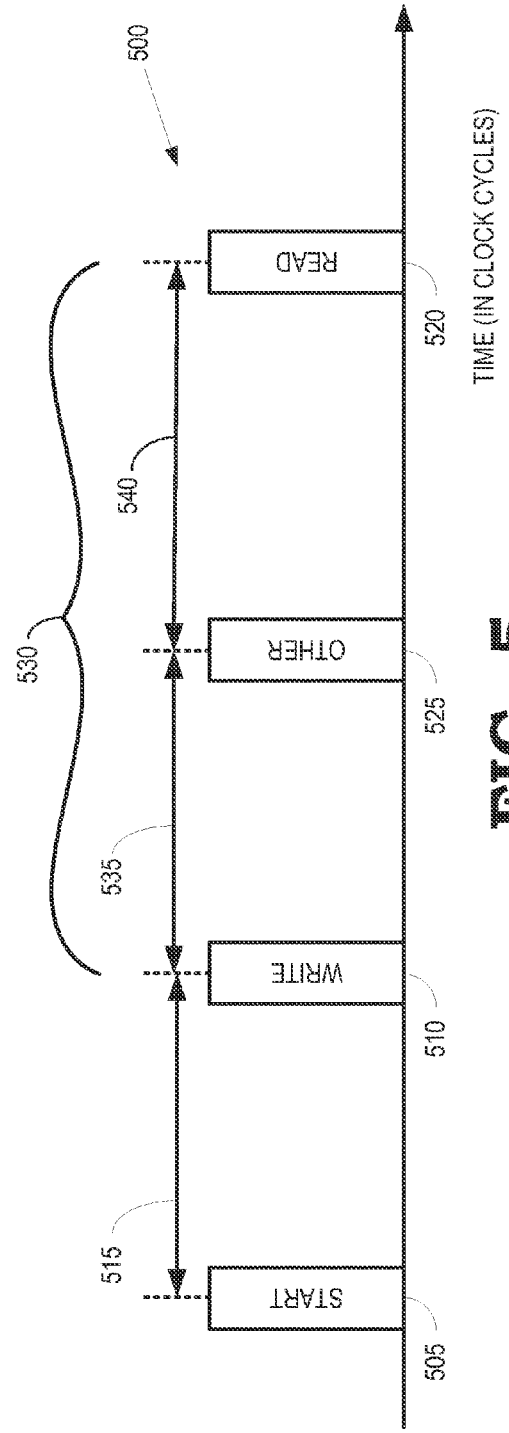
FIG. 4
FIG. 5

MEMORY PHYSICAL LAYER INTERFACE LOGIC FOR GENERATING DYNAMIC RANDOM ACCESS MEMORY (DRAM) COMMANDS WITH PROGRAMMABLE DELAYS

CROSS REFERENCE TO RELATED APPLICATIONS

This application is related to U.S. patent application Ser. No. 14/318,114, filed on Jun. 27, 2014, which is incorporated herein by reference in its entirety.

BACKGROUND

Field of the Disclosure

The present disclosure relates generally to processing systems and, more particularly, to a memory physical layer interface in a processing system.

Description of the Related Art

Processing systems such as systems-on-a-chip (SOCs) use memory to store data or instructions for later use. For example, an SOC may include processing units such as central processing units (CPUs), graphics processing units (GPUs), and accelerated processing units (APUs) that can read instructions or data from memory, perform operations using the instructions or data, and then write the results back into the memory. Processing systems may include a memory physical layer interface for controlling access to a memory module such as dynamic random access memory (DRAM) that can be used to store information so that the stored information can be accessed by the processing units during operation of the processing system. The memory physical layer interface in a processing system is conventionally referred to as a "memory PHY." A memory controller is typically used to control operation of the memory PHY.

The memory PHY typically is trained using sequences exchanged over an interface between the memory PHY and the DRAM before data can be accurately read from the DRAM or written to the DRAM. A training sequence may include multiple commands such as read commands, write commands, activate commands, or other commands that are used to perform other operations. The memory PHY or the DRAM may require commands in the training sequence to be separated by a specified delay time interval. For example, when a write command is followed by a read command, the DRAM may require a delay of 8 cycles between the write command and the read command. The delay time interval may be different for different types of commands. For example, the delay time interval between two write commands may be different than the delay time interval between a write command and a read command. The delay time interval may also be different for different types of DRAM and may change as new DRAM designs or timing standards are introduced.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 4 is a diagram illustrating a sequence of commands that may be issued by a training engine according to some embodiments.

FIG. 5 is a diagram illustrating a sequence of commands that may be issued by a training engine according to some embodiments.

DETAILED DESCRIPTION

Conventional training sequences use a predetermined sequence of commands that are separated by predetermined delay time intervals. Consequently, conventional training sequences cannot be modified, e.g., to account for the different timing requirements of different DRAM designs. However, as discussed herein, delay time intervals between commands issued to a DRAM may be different for different types of commands and the delay time interval may also be different for different types of DRAM and may change as new DRAM designs are introduced. To account for timing requirements of different memory PHY or DRAM designs, training sequences can be flexibly defined by a programmable training engine that is implemented in the memory PHY. The training engine may be programmed using instruction words that include a first field to indicate a command and a second field to indicate a delay time interval that is to elapse before executing the command. Some embodiments of the instruction words may also include other fields that indicate a DRAM address used by the command, a bank of the DRAM used by the command, a repetition count for the command, and the like. Some embodiments of the memory PHY include registers for holding the instruction words and a start bit that can be written to initiate execution of the instruction words stored in the registers.

Incorporating the delay time interval into the instruction word allows programmers to create training sequences that meet the requirements of different types of DRAM, as well as supporting the development of future training sequences that can meet the as-yet-unknown requirements of future DRAM designs. Furthermore, although two commands may need to be separated by a particular delay time interval, some embodiments of the memory PHY or DRAM may allow another type of command to be performed between the two commands. The delay time intervals indicated in the instruction words for the commands may therefore be set to values that allow the intermediate command to be executed while still meeting the delay time interval requirements for the other two commands.

Figure 1:
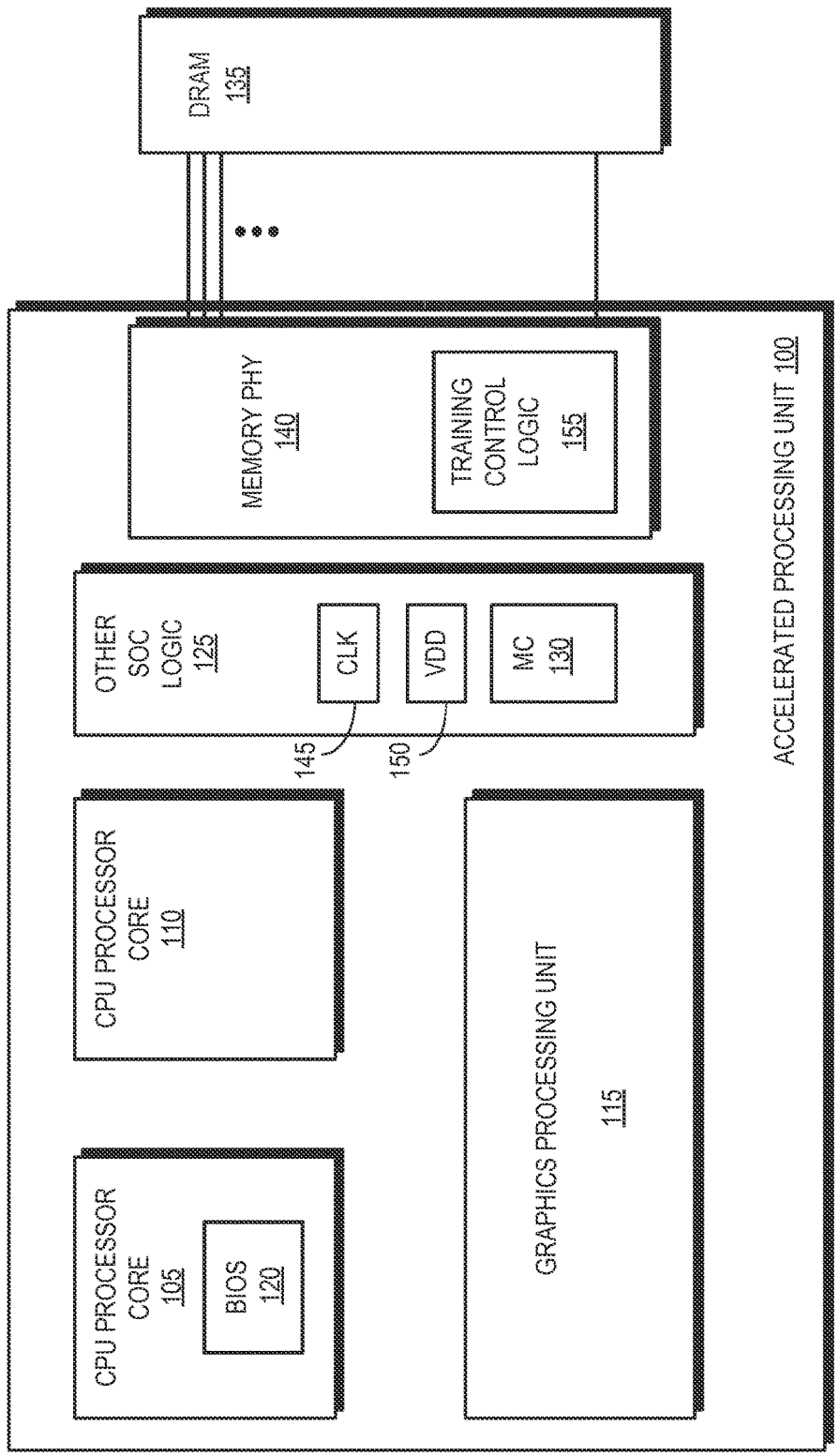
FIG. 1 is a block diagram of an accelerated processing unit (APU) that includes one or more central processing unit (CPU) processor cores and a graphics processing unit (GPU) according to some embodiments.

FIG. 1 is a block diagram of an accelerated processing unit (APU) 100 that includes one or more central processing unit (CPU) processor cores 105, 110 and a graphics processing unit (GPU) 115 according to some embodiments. The APU 100 may be implemented as a system-on-a-chip (SOC). The CPU processor cores 105, 110 can execute instructions independently, concurrently, or in parallel. Although the APU 100 shown in FIG. 1 includes two CPU processor cores 105, 110, persons of ordinary skill in the art having benefit of the present disclosure should appreciate that the number of processor cores in the APU 100 is a matter of design choice. Some embodiments of the APU 100 may include more or fewer than the two CPU processor cores 105, 110 shown in FIG. 1. The GPU 115 is used for creating visual images intended for output to a display. Some embodiments of the GPU 115 may also include multiple processing cores (not shown).

The CPU processor core 105 includes a basic input/output system (BIOS) 120 that may be implemented in hardware, firmware, software, or a combination thereof. Some embodiments of the BIOS 120 are used to initialize or test components of the APU 100, e.g., in response to a system including the APU 100 being powered on or booted up. The BIOS 120 may also be used to load an operating system. Instructions or commands generated by the BIOS 120 may be conveyed to other locations in the APU 100 using one or more data pipelines (not shown in FIG. 1). The BIOS 120 may alternatively be implemented in the CPU processor core 110 or other locations within the APU 100.

The APU 100 shown in FIG. 1 also includes other SOC logic 125. Some embodiments of the other SOC logic 125 may include a DMA engine (not shown) for generating addresses and initiating memory read or write cycles, for performing memory-to-memory data transfer, or for transferring data between the CPU processor cores 105, 110 or the GPU 115. The other SOC logic 125 may also include routing logic, coherency logic, or logic to implement other functionality. Some embodiments of the other SOC logic 125 include a memory controller (MC) 130 to coordinate the flow of data between the APU 100 and other memory such as an external dynamic random access memory (DRAM) 135. The memory controller 130 includes logic used to control reading information from the external memory and writing information to the external memory. The memory controller 130 may also include refresh logic that is used to periodically re-write information to the DRAM so that information in the memory cells of the DRAM is retained.

The memory controller 130 may control the operation of other memory modules such as the DRAM 135 using signals transmitted via a memory physical layer interface 140, which may be referred to as a memory PHY 140. The memory PHY 140 includes the circuitry used to drive signals that govern operation of the other memory modules that may be coupled to the APU 100. For example, the memory PHY 140 may provide signals that control reading, writing, refreshing, or erasing portions of a memory module such as the DRAM 135. The memory PHY 140 may be able to operate at different operating points, which may be determined by an operating frequency and/or operating voltage of the memory PHY 140. For example, the other SOC logic 125 may include a clock 145 provides a clock signal to govern synchronization in the memory PHY 140 and/or the memory controller 130 and a reference voltage (VDD) 150 that governs the voltage used by the memory PHY 140 and/or the memory controller 130.

The memory PHY 140 should be trained in order to improve the read or write performance during communication between the memory PHY 140 and the DRAM 135. The memory PHY 140 therefore includes integrated training control logic 155 that is used to generate training sequences or commands, transmit the training sequences or commands to the DRAM 135, receive signals generated by the DRAM 135 in response to the transmitting sequences or commands, and adjust the read/write parameters of the memory PHY 140 based on the responses from the DRAM 135. Integrating the training control logic 155 into the memory PHY 140 has a number of advantages over the conventional practice of training the memory PHY 140 using algorithms implemented in the BIOS 120. Post-processing and/or seeding of the training algorithm used by the training control logic 155 may be reduced or eliminated by removing the need to transmit training sequences over a data pipeline between the BIOS 120 and the memory PHY 140.

Some embodiments of the training control logic 155 include a microcontroller and one or more training engines for generating training sequences and using the training sequences to configure operation of the memory PHY 140. For example, the training control logic 155 may include a training engine that generates at-speed programmable sequences of commands for delivery to the DRAM 135. The training control logic 155 may also include (or have access to) one or more registers to store instruction words that include information identifying one or more commands that may be used to form the at-speed programmable sequences. The instruction words may also include information indicating a delay associated with the command, as well as other information. The training control logic 155 may then insert the indicated delay between the command and other commands in the command sequence, as discussed herein.

Figure 2:
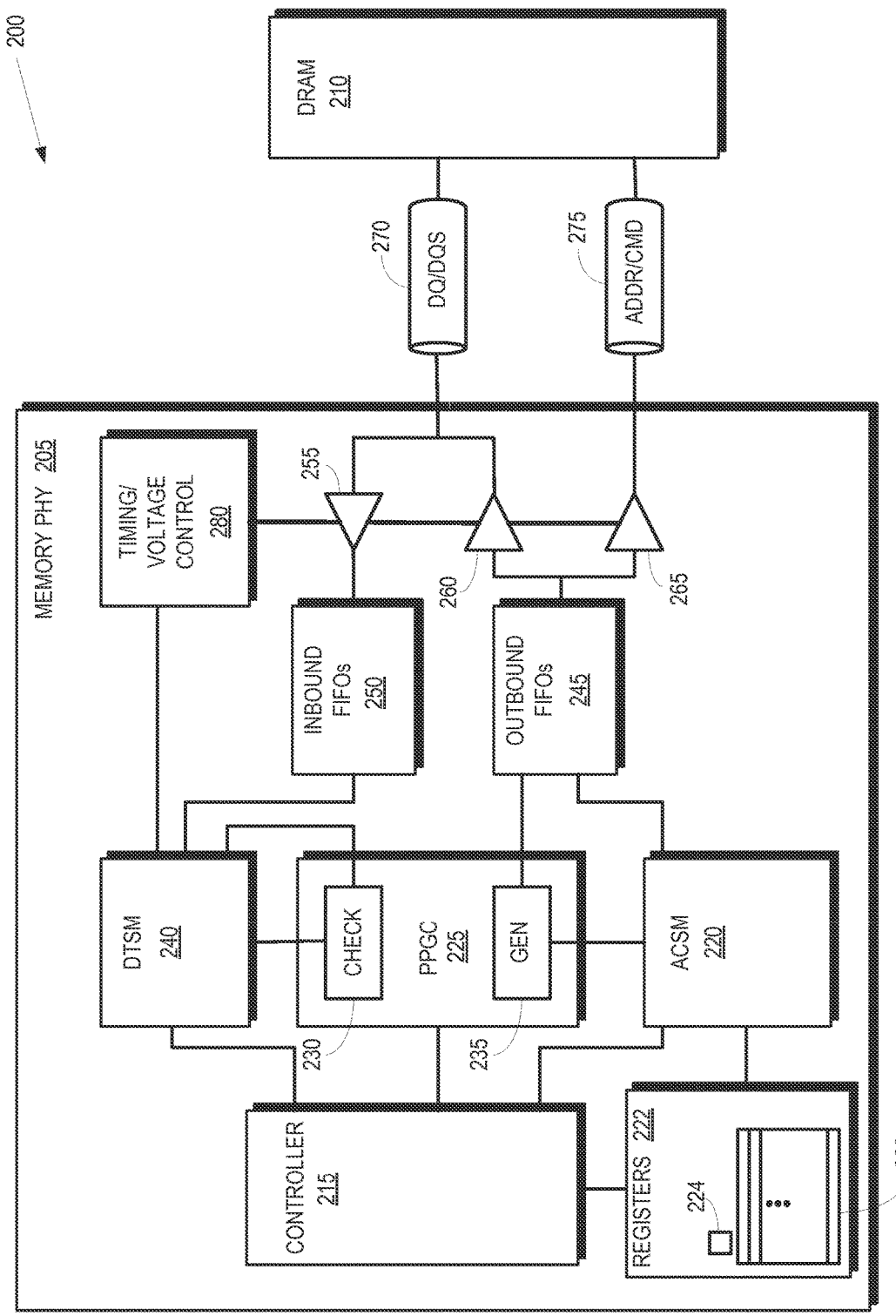
FIG. 2 is a block diagram of a portion of a processing unit that includes a memory physical layer interface (PHY) and a dynamic random access memory (DRAM) according to some embodiments.

FIG. 2 is a block diagram of a portion 200 of a processing unit that includes a memory PHY 205 and a DRAM 210 such as the memory PHY 140 and the DRAM 135 shown in FIG. 1 according to some embodiments. The memory PHY 205 includes a controller 215 that is used to control read training and write training of the memory PHY 205 for communication with the DRAM 210 based on a training algorithm. Some embodiments of the controller 215 may be implemented in hardware, firmware, software, or a combination thereof. The controller 215 may also be referred to as a microcontroller 215 in some embodiments. Since the controller 215 is integrated into the memory PHY 205 and is therefore not separated from the memory PHY 205 by a data pipeline, the training algorithm implemented by the controller 215 may be a seedless training algorithm. As discussed herein, a seedless training algorithm does not need to be configured using information that characterizes a signal path or data pipeline traversed by training sequences or commands generated by the training algorithm, e.g. for post-processing of the returned signals. The controller 215 may initiate training in response to power up, vertical retrace frequency changes, power state transitions (e.g., between idle and active states), periodically at a predetermined frequency, or in response to other events or signals.

The controller 215 may interact with a BIOS such as the BIOS 120 shown in FIG. 1. In some embodiments, the BIOS may configure the controller 215 by loading a memory array such as local static random access memory (SRAM), providing configuration information associated with the DRAM 210, or instructing the controller 215 to initiate a training sequence in response to the system booting up. However, once the controller 215 has been configured, some embodiments of the controller 215 can control training of the memory PHY 205 substantially independently of the BIOS and substantially without input from the BIOS. For example, the controller 215 implements a training algorithm that operates independently of the BIOS and can train the memory PHY 205 without receiving training commands or training sequences from the BIOS. Since the controller 215 can control training of the memory PHY 205 without input from the BIOS, which would have to be transmitted from the BIOS to the controller 215 over a data pipeline, the training algorithm may be implemented as a seedless training algorithm.

The controller 215 is coupled to a first training engine 220, which also may be referred to as an address command state machine (ACSM) 220. The ACSM 220 generates commands that may be provided to the DRAM 210 during training of the memory PHY 205. The programmable commands may be generated "at speed" for embodiments of the first training engine 220 that are implemented in hardware as an integrated part of the memory PHY 205. Commands generated by the ACSM 220 may include read commands to read information from a specified location in the DRAM 210, write commands to write information to a specified location in the DRAM 210 and other commands such as activate commands. Some embodiments of the ACSM 220 may generate loopback commands that combine concurrent read and write commands that drive signals to the physical pins of the memory PHY 205, which are then returned along paths through the memory PHY 205. Loopback commands may therefore be used to test the memory PHY 205 without requiring that the DRAM 210 be connected to the physical pins of the memory PHY 205. Some embodiments of the ACSM 220 may generate looped commands that repetitively perform one or more commands with a specified delay between the commands, looping or repeating on a single instruction during execution, looping over multiple commands in a sequence, and the like.

One or more registers 222 are accessible, e.g., they may be read or written, by the ACSM 220. The registers 222 shown in FIG. 2 are external to the ACSM 220. However, in some embodiments, the registers 222 or the memory location 224 may be implemented within the ACSM 220 or at other locations. Some embodiments of the registers 222 may include physical registers for storing information used to configure or control the ACSM 220 and other physical registers that are used to store instruction words 223. For example, the registers 222 may include a first predetermined number of physical registers for ACSM control and a second predetermined number of registers for storing information associated with a predetermined number of instruction words 223. The second predetermined number of registers may be larger than the first predetermined number of registers. Each register may be a 16-bit register or other size register.

The registers 222 are used to store instruction words 223 that each include information indicating a command and a timing delay associated with the command. The instruction words 223 may be written into the registers 222 by the controller 215. The timing delay indicates a delay that is to be inserted between the command in the instruction word and other commands, e.g., commands in other instruction words 223. The timing delay may be inserted before the corresponding command is executed or after the corresponding command is executed. In some embodiments, the instruction words 223 may also include other information such as a command repetition count that indicates a number of repetitions of the command indicated in the instruction word, an address in an external memory such as the DRAM 210, algorithmic address generation control information that can be used to generate addresses for accessing the DRAM 210, a bank in the external memory, and the like. The algorithmic address generation control information may include information used to define polynomials for random selection of addresses, information for incrementing addresses, address offsets or strides, information used to rotate addresses, and the like.

Some embodiments of the registers 222 may also include a memory location 224 for storing one or more control bits that may be used to indicate information such as start addresses, sequence loop addresses, and the like. The ACSM 220 may initiate execution of one or more commands or command sequences in response to the controller 215 writing a predetermined value of the start bit to the memory location 224. Some embodiments of the instruction words 223 stored in the registers 222 may include a terminate bit that can be used to terminate execution of a sequence of commands by writing a particular value of the terminate bit into the instruction word.

The controller 215 is also coupled to a second training engine 225, which may be referred to as a PRBS pattern generator checker (PPGC) 225. Some embodiments of the PPGC 225 are programmable and can generate data streams that are used as the training sequences for training the memory PHY 205. For example, the PPGC 225 may generate a data stream for any 16-bit (or less) polynomial in response to signaling provided by the controller 215. Some embodiments of the PPGC 225 include a separate generator 235 that is used to generate the training sequence and a checker 230 that is used to check synchronization of the read or write streams that include the training sequences that flow between the memory PHY 205 and the DRAM 210. Operation of the PPGC 225 may be controlled by signaling received from the ACSM 220. For example, the ACSM 220 may provide signaling that sequences execution of operations such as generating the training sequences at the generator 235.

The controller 215 is also coupled to a third training engine, which may be referred to as a data training state machine (DTSM) 240. The DTSM 240 compares traffic received from the DRAM 210 to the training sequences provided to the DRAM 210 to determine whether to adjust timing parameters or voltage offset parameters used by the memory PHY 205. For example, the PPGC 225 may provide representations of the training sequences to the DTSM 240 for comparison to the sequences returned from the DRAM 210 during read training or write training of the memory PHY 205. Prior to starting a training loop, the controller 215 may configure the DTSM 240 to control timing parameters or voltage offset parameters used by the memory PHY 205. The controller 215 may then program the ACSM 220 and the PPGC 225 to drive one or more training sequences. The DTSM 240 may then compare the training sequences generated by the PPGC 225 to sequences that have been received from the DRAM 210. For example, the DTSM 240 may correlate the training sequences and the receive sequences at a plurality of different delays. Based on the comparison, the DTSM 240 decides whether to adjust the timing parameters or the voltage offset parameters, e.g., by incrementing or decrementing one or more of these parameters. For example, a timing offset may be increased or decreased based on the delay determined based on the correlation of the training sequences and the receive sequences. Some embodiments of the DTSM 240 may also implement data filters or binary adders with upper or lower threshold comparison logic to train to a data contour eye position.

Sets of first-in-first-out (FIFO) buffers may be used to buffer the training sequences before being provided to the DRAM 210 and to buffer received sequences after being received from the DRAM 210. For example, a set of outbound FIFO buffers 245 may be used to buffer the outbound traffic and a set of inbound FIFO buffers 250 may be used to buffer the inbound traffic. One or more receivers 255 may be used to receive signals over channels to the DRAM 210 and provide them to the inbound FIFO buffer 250. One or more drivers 260, 265 may be used to transmit signals from the outbound FIFO buffer 245 over the channels to the DRAM 210. For example, the driver 260 may be used to drive data (DQ) or timing (DQS) signals onto the channel 270 and the receiver 255 may receive data (DQ) or timing (DQS) signals over the channel 270. For another example, the driver 265 may be used to drive addresses (ADDR) or commands (CMD) over the channel 275 to the DRAM 210. Timing delays and voltage offsets used by the receivers 255 or the drivers 260, 265 may be adjusted.

The memory PHY 205 includes timing/voltage control logic 280. The DTSM 240 may provide signals to the timing/voltage control logic 280 to indicate adjustments to the timing parameters. For example, the DTSM 240 may instruct the timing/voltage control logic 280 to increment or decrement timing delays or voltage offsets based on comparisons of training sequences provided to the DRAM 210 and sequences received from the DRAM 210. The timing/voltage control logic 280 may then provide control signals to the receivers 255 or the drivers 260, 265 to adjust the timing delays or voltage offsets used by the receivers 255 or the drivers 260, 265. Some embodiments of the timing/voltage control logic 280 may be used to adjust timing delays or voltage offsets in multiple stages such as a receive enable stage, a write leveling stage, a read training stage, a write training stage, and a stage for determining voltage levels of a data eye contour for the interface between the memory PHY 205 and the DRAM 210.

Figure 3:
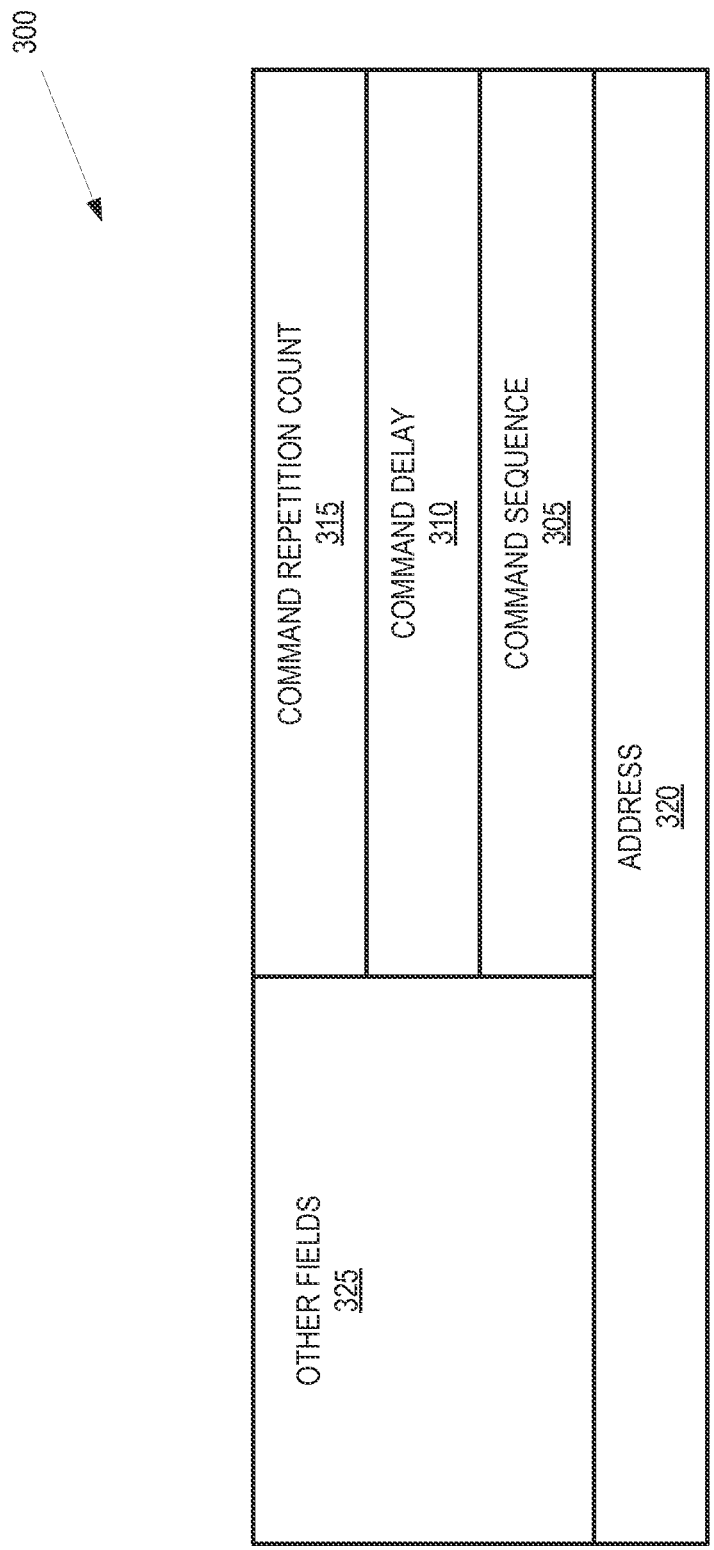
FIG. 3 is a block diagram of an example of an instruction word that can be stored in registers according to some embodiments.

FIG. 3 is a block diagram of an example of an instruction word 300 according to some embodiments. Some embodiments of the instruction word 300 can be stored in registers such as the instruction words 223 stored in the registers 222 shown in FIG. 2. The instruction word 300 includes a field 305 for storing information indicating a command type such as a read command, a write command, an activate command, or other commands that can be executed as part of training sequences for a memory PHY such as the memory PHY 205 shown in FIG. 2. The instruction word 300 also includes a field 310 for storing information indicating a command delay associated with the command indicated in the field 305. Some embodiments of the field 310 may include information indicating a number of cycles that should elapse before or after executing the command indicated in the field 305.

Some embodiments of the instruction word 300 also include a field 315 for storing information indicating a command repetition count that indicates the number of times that the command indicated in the field 305 should be repeated. The command delay indicated in the field 310 may be applied to each repetition of the command. A field 320 may include an address associated with the command indicated in the field 305. The address may indicate a location in an external memory (such as the DRAM 210 shown in FIG. 2) that may be read from or written to during execution of the command. Some embodiments of the instruction word 300 may also include one or more fields 325 for storing other information such as algorithmic address generation control information that can be used to generate addresses for accessing the external memory, a bank in the external memory, a terminate bit that can be used to terminate execution of a sequence of commands by writing a particular value of the terminate bit into the instruction word 300, and the like.

FIG. 4 is a diagram illustrating a sequence 400 of commands that may be issued by a training engine such as the ACSM 220 shown in FIG. 2 according to some embodiments. The horizontal axis indicates time in clock cycles and increases from left to right, as indicated by the direction of the arrow. The sequence 400 starts at block 405. For example, the sequence 400 may be initiated in response to a controller such as the controller 215 shown in FIG. 2 configuring the training engine by writing information to memory associated with the training engine. The controller may then write a start bit to a particular location such as the location 224 shown in FIG. 2 to start the sequence 400 at 405. The training engine may then read an instruction word from a register. For example, the training engine may read the instruction word at a register indicated by a start address pointer. The instruction word includes information identifying a command to be executed by the training engine and a command delay associated with the command. Examples of commands include write commands that are used to write information to an external memory such as a DRAM, read commands that are used to read information from the external memory, activation commands, and the like.

The first command read by the training engine is a write command 410, which is executed following a delay 415 that is at least as long as the predetermined time interval indicated by the command delay in the instruction word. The training engine may then read the next instruction word from the registers. The next instruction word includes information indicating that the next command is a read command 420. In some embodiments, a predetermined amount of time may be required to elapse between performing a write command that writes information to the external memory and performing a read command that reads information from the external memory. The required latency may depend on the characteristics of the external memory such as the type of DRAM that is connected to the memory PHY that implements the training engine. Programmers may therefore indicate an appropriate command delay between the write command 410 and the subsequent read command 420 in a command delay field of the instruction word. The training engine may therefore delay execution of the read command 420 for a time interval 425 that is at least as long as the predetermined time interval indicated by the command delay in the instruction word.

The training engine may read a subsequent instruction word from the registers. In some embodiments, the subsequent instruction word includes information identifying a read command 430 that is used to read information from the external memory following the previous read command 420. A predetermined time interval may be required to elapse between performing two consecutive read commands 420, 430 and this time interval may be indicated in the command delay field in the instruction word. The training engine may therefore delay execution of the read command 430 for a time interval 435 that is at least as long as the predetermined time interval indicated by the command delay in the instruction word. The predetermined time interval that should elapse between two consecutive read commands 420, 430 may be different than the predetermined time interval that should elapse between a write command 410 and a read command 420.

Generally speaking, the time intervals that should elapse between different types of commands may depend on the types of commands, the order in which the commands are performed, or other characteristics of the commands, the memory PHY, or external memory including different dual in-line memory modules (DIMMs). For example, different DIMMs may be located at different distances relative to the memory PHY and consequently communications between the memory PHY and the different DIMMs may experience different transport delays. The delays indicated in the instruction words may be used to account for the different transport delays, e.g. to prevent information returned in response to a read command issued to the most distant DIMM from colliding with (or arriving at the memory PHY after) information returned in response to a subsequent read command issued to a DIMM that is closer to the memory PHY. Including the command delay field in the instruction word provides programmers with the flexibility to adapt the command sequence 400 to the requirements of particular embodiments.

FIG. 5 is a diagram illustrating a sequence 500 of commands that may be issued by a training engine such as the ACSM 200 shown in FIG. 2 according to some embodiments. The horizontal axis indicates time in clock cycles and increases from left to right, as indicated by the direction of the arrow. The sequence 500 starts at block 505. For example, the sequence 500 may be initiated in response to the controller writing a start bit to a particular location such as the location 224 shown in FIG. 2. The training engine may then read an instruction word from a register, e.g., a register indicated by a start pointer. The instruction word includes information identifying a write command 510 to be executed by the training engine and a command delay associated with the write command 510. The write command 510 is executed following a delay 515 that is at least as long as the predetermined time interval indicated by the command delay in the instruction word.

The next two commands include a read command 520 and one or more other commands 525. The read command 520 should be executed with a latency 530 relative to the write command 510. The other command 525 can be executed without any particular latency relative to the write command 510 or the read command 520, or with a relatively small latency relative to the latency 530. The delays 535, 540 in the instruction words associated with the read command 520 and the other command 525 may therefore be configured so that the sum of the two delays 535, 540 is at least as large as the latency 530. The training engine may therefore execute the other command 525 after the delay 535 and subsequently execute the read command 520 after the delay 540, which also satisfies the requirement that the read command 520 be executed with a latency 530 relative to the write command 510.

Figure 6:
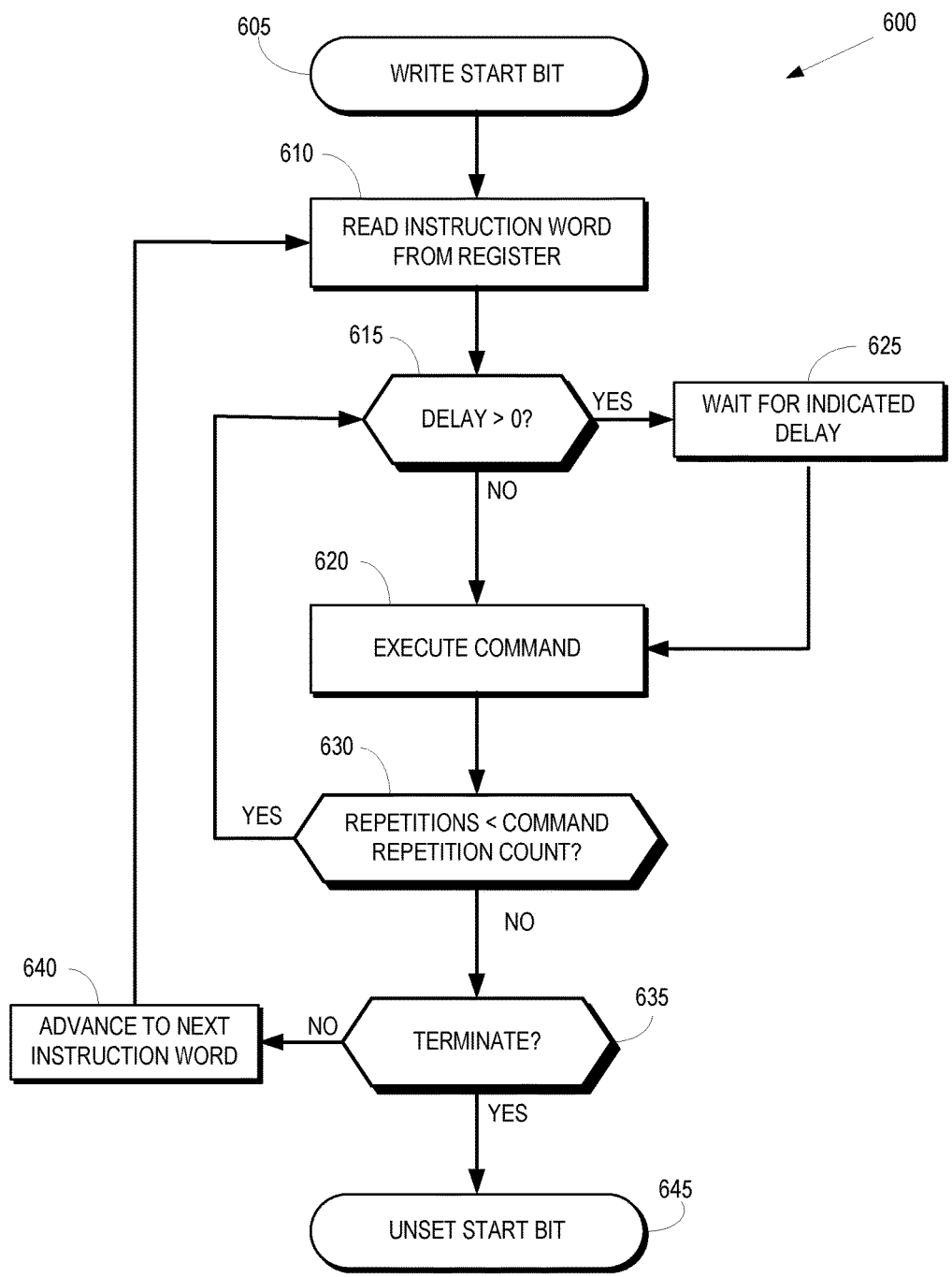
FIG. 6 is a flow diagram of a method of executing command sequences according to some embodiments.

FIG. 6 is a flow diagram of a method 600 of executing command sequences according to some embodiments. The method 600 may be implemented in a training engine such as the ACSM 220 shown in FIG. 2. At block 605, the method 600 begins in response to the training engine writing a start bit. At block 610, the training engine reads an instruction word from a register such as a register indicated by a start pointer maintained by the training engine. At decision block 615, the training engine determines whether the instruction word includes information indicating a command delay associated with a command indicated by the instruction word. If not, the training engine can issue the command without constraint and the command may be executed at block 620. If so, the training engine is constrained to issue the command after a time interval that is at least as long as the indicated delay. The training engine may therefore wait for at least the indicated delay at block 625. The training engine may then issue the command, which may be executed at block 620.

Some embodiments of the instruction word may include a command repetition field that indicates a number of repetitions of the command in the instruction word. At decision block 630, the training engine determines whether the command has been repeated for a number of repetitions that is less than a command repetition count indicated in the command repetition field. If the number of repetitions is less than the command repetition count, indicating that the command should be repeated at least one more time, the training engine determines the appropriate delay at decision block 615 and executes the command at the block 620, possibly after waiting for the indicated delay at block 625. The method 600 may flow to decision block 630 once the number of repetitions is greater than or equal to the command repetition count. Some embodiments of the training engine may maintain a counter to keep track of the number of repetitions of the command.

At decision block 635, the training engine determines whether to terminate the command sequence with the current instruction word. In some embodiments, the command sequence may be terminated in response to a terminate bit being set in the current instruction word. If the training engine determines that the command sequence is not to be terminated, the training engine may advance to the next instruction word (at block 640), e.g., by advancing the start pointer to the next register. The method 600 may then flow to block 610, where the next instruction word is read from the register. If the training engine determines that the command sequence is to be terminated, the command sequence may be terminated the method 600 may end by unsetting the start bit at block 645.

Figure 7:
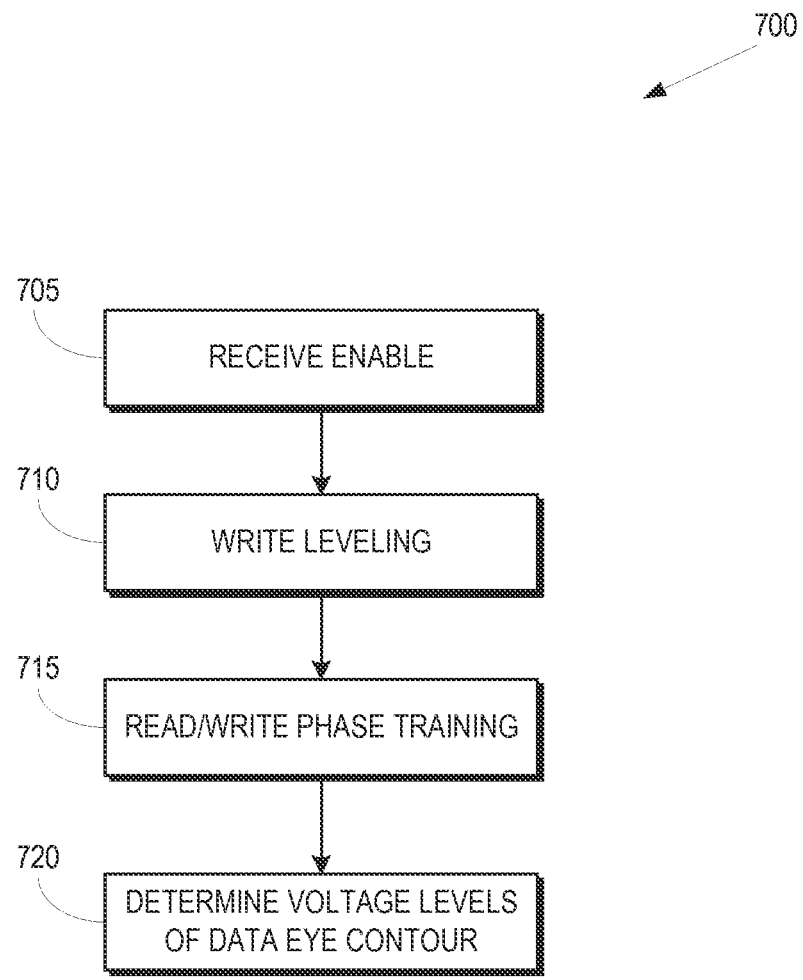
FIG. 7 is a flow diagram of a method of training a memory PHY that may be implemented in a processing unit such as the APU shown in FIG. 1 according to some embodiments.

FIG. 7 is a flow diagram of a method 700 of training a memory PHY that may be implemented in a processing unit such as the accelerated processing unit 100 shown in FIG. 1 according to some embodiments. Embodiments of the method 700 may be implemented in training control logic such as the training control logic 155 shown in FIG. 1 or the controller 215, ACSM 220, PPGC 225, DTSM 240, and timing/voltage control logic 280 shown in FIG. 2.

At block 705, the training control logic performs receive enable training to determine when to enable the memory PHY to receive data over the interface with the DRAM. Some embodiments perform receive enable training by transmitting a read commands to read a selected address from the DRAM. The read commands are interspersed with a sequence of bubbles that generate corresponding sequences of bubbles in the signals received from the DRAM. The training control logic then monitors signals received from the DRAM to align the time of command generation in the memory PHY to the time the command response from the DRAM is returned to the memory PHY. The bubble spacing time interval range is sized so as to be greater than the worst case round trip latency plus any internal memory PHY and DRAM latencies in the path. This avoids any potential aliasing of the command response association with an earlier or later response. The memory PHY may be configured to stay in a continuous read state during the receive enable training stage. For example, the controller 215 may configure the ACSM 220, PPGC 225, and DTSM 240 and then initiate the training stage. The ACSM 220 may issue commands/addresses to write a training sequence to the DRAM 210 and then issue commands/addresses to read the training sequence back from the DRAM 210. In some embodiments, no information is actually written to the DRAM 210 in response to the issued commands and the DQ bus is ignored. Only the returned DQS is monitored. The issued command is therefore similar to a read command but the DTSM 240 does not care what data is returned in response to the command. The DTSM 240 is only interested in adjusting the timing of the DQS strobe that comes back from DRAM 210. The training sequence may be generated by the PPGC 225 and provided to the DRAM 210. The DTSM 240 may then correlate receive data from the DRAM 210 with the training sequence to identify the round-trip delay and instruct the timing/voltage control logic 280 to tune the parameters for the appropriate receivers/drivers such as the receivers 255 and the drivers 260, 265 to null the detected round trip delay.

At block 710, the training logic performs write leveling to align clock signals used by the memory PHY to clock signals used by the DRAM. Some embodiments of the training logic may therefore transmit a memory PHY clock signal and a timing (DQS) signal that is used to sample the value of the clock at the DRAM. The training logic may then use the sampled value of the DRAM clock returned on the DQ bus to align the memory PHY clock and the DRAM clock, e.g., by introducing delays to align the DQS signal with a memory clock phase that is internal to the DRAM. For example, in response to signaling from the controller 215, the ACSM 220 may generate a write command that causes a memory PHY clock signal including a rising edge and a DQS signal that is provided to the DRAM 210 to sample the memory clock in the DRAM. The write command may be generated based on information read from registers 222, as discussed herein. The sampled value of the DRAM clock may then be returned to the memory PHY 205. The checker 230 in the PPGC 225 generates an internal comparison value and provides this value to the DTSM 240. The DTSM 240 may then compare the internal comparison value to the sampled clock signal value received from the DRAM 210 and generate adjustment signals based on the comparison to align the write DQS to the clock in the DRAM 210. The DTSM 240 may then instruct the timing/voltage control logic 280 to tune the timing parameters for the receivers 255 and the drivers 260, 265 to synchronize the memory PHY clock and the DRAM clock. For example, if the internal comparison value is "0" and the sampled value of the DRAM clock is "1," the DTSM 240 may instruct the timing/voltage control logic 280 to advance the timing of the memory PHY 205 by a predetermined amount of time. If the internal comparison value is "1" and the sampled value of the DRAM clock is "1," the DTSM 240 may instruct the timing/voltage control logic 282 delay the timing of the memory PHY 205 by a predetermined amount of time. This process may be iterated to tune the synchronization of the memory PHY clock and the DRAM clock to within a predetermined tolerance.

At block 715, the training logic performs read/write phase training to determine the one-dimensional time boundaries of the data eye contour based on the read/write data paths between the memory PHY and the DRAM. Some embodiments of the training logic may therefore transmit a series of commands to write a training sequence into addresses in the DRAM and then loop-read the training sequences out of the addressed locations of the DRAM at different delays to determine the one-dimensional time boundaries of the data eye contour. For example, in response to signaling from the controller 215, the ACSM 220 may issue commands to write one or more sequences generated by the PPGC 225 to one or more addresses in the DRAM 210. The ACSM 220 may then issue a series of read commands to the addresses in the DRAM 210 that are looped with different delay values. Some embodiments of the command sequences may be generated by the ACSM 220 based on information read from instruction words in the registers 222, as discussed herein. The DTSM 240 may then compare the received sequences for each of the looped read commands to the provided training sequences to determine the left edge and the right edge of the data eye contour. The DTSM 240 may then instruct the timing/voltage control logic 280 to tune the timing parameters, e.g., the phase, for the receivers 255 to correspond to a predetermined location in the data eye contour such as the midpoint between the left edge and the right edge.

At block 720, the training logic performs two-dimensional (2D) read/write phase training to determine the voltage levels of the data eye contour based on the read/write data paths between the memory PHY and the DRAM. Some embodiments of the training logic may therefore transmit a series of read/write commands to read and write training sequences to and from the DRAM. The series of read/write commands may be performed using different timing delays and different voltage offsets to determine the voltage levels in the data eye contour. For example, in response to signaling from the controller 215, the ACSM 220 may issue commands to write one or more sequences generated by the PPGC 225 to one or more addresses in the DRAM 210 using an initial timing delay. The ACSM 220 may then issue a series of looped read commands to the addresses in the DRAM 210. The read/write commands may be issued concurrently with providing different values of the voltage offset to the receivers 255 or the drivers 260, 265. Some embodiments of the command sequences may be generated by the ACSM 220 based on information read from instruction words in the registers 222, as discussed herein. The DTSM 240 may then compare the received sequences for each of the looped read commands to the provided training sequences to determine the voltage levels between the left edge and the right edge of the data eye contour for the initial timing delay. The timing delay may be changed (e.g., incremented or decremented) and the process of determining the voltage levels may be repeated. This process may be iterated to determine the two-dimensional data eye contour over a range of timing delays and voltage levels. Some embodiments may instead iteratively choose voltage levels and loop over timing delays for the selected voltage level to determine the two-dimensional data eye contour.

The DTSM 240 instructs the timing/voltage control logic 280 to tune the timing delays and the voltage offsets for the receivers 255 or the drivers 260, 265 to correspond to a location in the data eye contour that provides the best voltage level and timing delay. Adjustments to the timing delays or the voltage offsets can be determined based on numbers of correct samples and incorrect samples in sampled training data. Some embodiments of the DTSM 240 may determine the optimal timing delay and voltage offset based on a predetermined ratio of correct samples to incorrect samples in sampled training data. For example, the DTSM 240 may tune the timing delay and the voltage offset until the ratio of the number of correct samples to the number of incorrect samples received by the memory PHY 205 is at or below the predetermined ratio. Some embodiments of the DTSM 240 may use the predetermined ratio to alter the shape of the data eye contour with the expectation that a better optimal training position could be determined. For example, the 2D eye contour could be expanded or contracted based on the predetermined ratio. Other alterations to the shape of the 2-D data eye contour are also possible.

In some embodiments, the apparatus and techniques described above are implemented in a system comprising one or more integrated circuit (IC) devices (also referred to as integrated circuit packages or microchips), such as the memory PHY described above with reference to FIGS. 1-7. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 8:
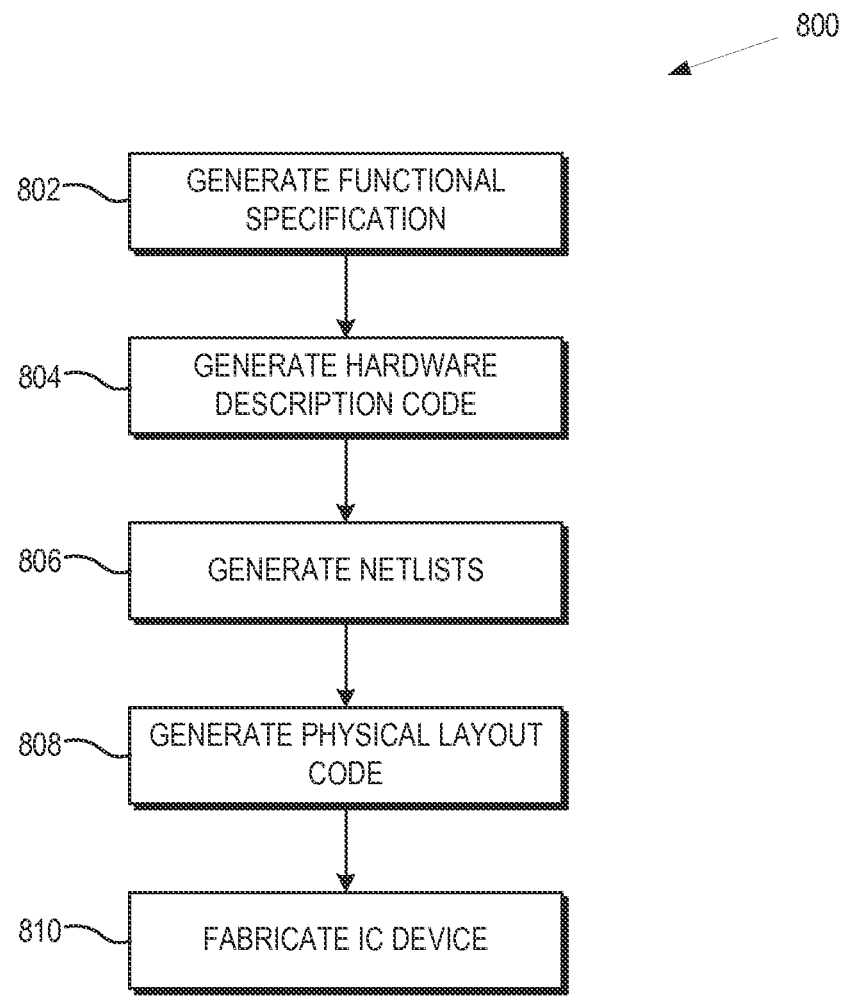
FIG. 8 is a flow diagram illustrating a method for designing and fabricating an integrated circuit device implementing at least a portion of a component of a processing system in accordance with some embodiments.

FIG. 8 is a flow diagram illustrating an example method 800 for the design and fabrication of an IC device implementing one or more aspects in accordance with some embodiments. As noted above, the code generated for each of the following processes is stored or otherwise embodied in non-transitory computer readable storage media for access and use by the corresponding design tool or fabrication tool.

At block 802 a functional specification for the IC device is generated. The functional specification (often referred to as a micro architecture specification (MAS)) may be represented by any of a variety of programming languages or modeling languages, including C, C++, SystemC, Simulink, or MATLAB.

At block 804, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 806 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 808, one or more EDA tools use the netlists produced at block 806 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 810, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
   a memory physical layer interface (PHY) to couple to an external memory having timing requirements for commands based on a design of the external memory;
   a plurality of registers implemented in association with the memory PHY, the plurality of registers to store at least one instruction word that indicates at least one command and at least one programmable delay, wherein the at least one programmable delay is programmed based on the timing requirements of the external memory and is a time interval that is to elapse before executing the command; and
   a first programmable training engine implemented in the memory PHY to:
      read the at least one instruction word in response to a controller writing a start bit;
      generate, based on said at least one instruction word, at-speed programmable training sequences of commands for delivery to the external memory;
      delay the commands based on the at least one programmable delay;
      execute the commands;
      receive signals generated by the external memory in response to the programmable training sequences;
      adjust read/write parameters of the memory PHY based on the received signals; and
      unset the start bit in response to determining that the programmable training sequences are to be terminated.

2. The apparatus of claim 1, further comprising:
   a memory location implemented in association with the memory PHY, wherein the first training engine initiates execution of said at least one command in response to the controller writing the start bit to the memory location.

3. The apparatus of claim 2, wherein the first training engine is to determine said at least one delay based on said at least one command, and wherein the controller is to write said at least one instruction word to the plurality of registers.

4. The apparatus of claim 3, wherein said at least one command comprises first, second, and third commands, and wherein the first training engine is to execute the first command, execute the second command after a first delay relative to executing the first command, and execute the third command after a second delay relative to executing the second command, and wherein a sum of the first delay and the second delay satisfies a latency requirement for the first command and the third command.

5. The apparatus of claim 1, wherein said at least one instruction word indicates at least one command repetition count that indicates a number of repetitions of said at least one command.

6. The apparatus of claim 1, wherein said at least one instruction word indicates at least one of an address in the external memory, an algorithmic address generation control, a bank in the external memory, and a terminate bit.

7. The apparatus of claim 1, further comprising:
   a controller integrated in the memory PHY, wherein the controller is to control training of the memory PHY for communication with the external memory based on a seedless training algorithm.

8. The apparatus of claim 1, further comprising:
   a second training engine to generate training sequences for delivery to the external memory in response to control signaling generated by the first training engine; and
   a third training engine to compare sequences received from the external memory to the training sequences generated by the second training engine.

9. A method comprising:
   reading, at a first training engine implemented in a memory physical layer interface (PHY), in response to a controller writing a start bit, at least one instruction word that indicates at least one command and at least one programmable delay, wherein the at least one programmable delay is programmed based on timing requirements of an external memory and is a time interval that is to elapse before executing the at least one command;
   generating, using the first training engine at-speed programmable training sequences of commands based on the at least one instruction word for delivery to the external memory, wherein the commands are to be delayed based on said at least one programmable delay, and wherein said at least one command comprises first, second, and third commands, and further comprising:
   executing the first command;
   executing the second command after a first delay relative to executing the first command; and executing the third command after a second delay relative to executing the second command, and wherein a sum of the first delay and the second delay satisfies a latency requirement for the first command and the third command; and unsetting the start bit in response to determining that the programmable training sequences are to be terminated;

receiving, at the first training engine, signals generated by the external memory in response to the programmable training sequences of commands; and adjusting, at the first training engine, read/write parameters of the memory PHY based on the received signals.

10. The method of claim 9, further comprising:

the controller writing the start bit to a memory location implemented in the memory PHY.

11. The method of claim 9, further comprising:

determining said at least one delay based on said at least one command; and writing said at least one instruction word to a plurality of registers.

12. The method of claim 9, further comprising executing said at least one command for a number of repetitions indicated by at least one command repetition count in said at least one instruction word, wherein repetitions of said at least one command are delayed by said at least one delay.

13. The method of claim 9, wherein accessing said at least one instruction word comprises accessing said at least one instruction word that indicates at least one of an address in the external memory, an algorithmic address generation pattern, a bank in the external memory, and a terminate bit.

14. The method of claim 9, further comprising:

terminating execution of said at least one command in response to detecting a predetermined value of a terminate bit in said at least one instruction word.

15. The method of claim 9, further comprising:

generating, at a controller integrated in the memory PHY, control signaling for training of the memory PHY for communication with the external memory based on a seedless training algorithm.

16. The method of claim 15, further comprising:

providing second control signaling from the first training engine to a second training engine, wherein the second training engine is to generate training sequences for delivery to the external memory in response to the second control signaling from the first training engine; and providing third control signaling from the first training engine to a third training engine, wherein the third training engine is to compare sequences received from the external memory to the training sequences generated by the second training engine in response to the third control signaling.

17. A non-transitory computer readable storage medium embodying a set of executable instructions, the set of executable instructions to manipulate at least one processor to:

read, in response to a controller writing a start bit, at least one instruction word that indicates at least one command and at least one programmable delay, wherein the at least one programmable delay is programmed based on timing requirements of an external memory and is a time interval that is to elapse before executing the at least one command;

generate, using a first training engine implemented in a memory physical layer interface (PHY), at-speed programmable training sequences of commands based on the least one instruction word for delivery to the external memory, wherein the commands are to be delayed based on said at least one delay;

delay the commands based on the at least one programmable delay;

execute the commands;

unset the start bit in response to determining that the programmable training sequences are to be terminated;

receive, at the first training engine, signals generated by the external memory in response to the programmable training sequences of commands; and adjust, at the first training engine, read/write parameters of the memory PHY based on the received signals.

18. The non-transitory computer readable storage medium of claim 17, further embodying a set of executable instructions to manipulate said at least one processor to determine said at least one delay based on said at least one command and write said at least one instruction word to a plurality of registers.

19. The non-transitory computer readable storage medium of claim 18, further embodying a set of executable instructions to manipulate said at least one processor to write the start bit to a storage location implemented in the memory PHY and terminate execution of said at least one command in response to detecting a predetermined value of a terminate bit in said at least one instruction word.

\* \* \* \* \*